United States Patent
Fukuzono et al.

(10) Patent No.: US 12,388,701 B2
(45) Date of Patent: Aug. 12, 2025

(54) WIRELESS COMMUNICATION SYSTEM, WIRELESS COMMUNICATION METHOD, AND RECEPTION APPARATUS

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Daisei Uchida, Musashino (JP); Masafumi Yoshioka, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 15 days.

(21) Appl. No.: 18/683,780

(22) PCT Filed: Aug. 19, 2021

(86) PCT No.: PCT/JP2021/030455
§ 371 (c)(1),
(2) Date: Feb. 15, 2024

(87) PCT Pub. No.: WO2023/021664
PCT Pub. Date: Feb. 23, 2023

(65) Prior Publication Data
US 2024/0364572 A1    Oct. 31, 2024

(51) Int. Cl.
*H04L 27/38* (2006.01)
(52) U.S. Cl.
CPC ................ *H04L 27/38* (2013.01)
(58) Field of Classification Search
CPC .......................................... H04L 27/38
See application file for complete search history.

(56) References Cited

U.S. PATENT DOCUMENTS

| | | | | |
|---|---|---|---|---|
| 5,815,531 A | * | 9/1998 | Dent ................ | H04L 27/362 375/297 |
| 2016/0056989 A1 | * | 2/2016 | Murakami ........ | H04W 28/0263 375/298 |
| 2020/0162223 A1 | * | 5/2020 | Han ................ | H04L 1/1607 |

FOREIGN PATENT DOCUMENTS

| EP | 1061642 A2 * 12/2000 ........... H03F 1/3247 |
|---|---|
| EP | 3010191 A1    4/2016 |

(Continued)

OTHER PUBLICATIONS

Ibnkahla, "High-Speed Satellite Mobile Communications: Technologies and Challenges", Proceedings of the IEEE, vol. 92, No. 2, Feb. 2004, pp. 312-339.

(Continued)

*Primary Examiner* — Freshteh N Aghdam
(74) *Attorney, Agent, or Firm* — XSENSUS LLP

(57) ABSTRACT

Provided is a wireless communication system using a single-carrier multi-value modulation scheme, the wireless communication system aiming at preventing erroneous transmission of data and securing a high data rate while utilizing a non-linear region of an amplifier. A reception apparatus acquires, from a transmission apparatus, a specification related to an input/output characteristic of a transmission signal amplifier and transmission power of data transmission. On the basis of the specification and the transmission power, a constellation of signal points is estimated. A reception point, which is a point in constellation coordinates, of a reception signal is detected, and likelihood calculation for the reception point is performed with respect to the signal points. A symbol intended by the reception point is identified on the basis of a result of the likelihood calculation.

20 Claims, 11 Drawing Sheets

(56) References Cited

FOREIGN PATENT DOCUMENTS

| JP | 2010-171905 A | 8/2010 |
|---|---|---|
| JP | 2015-002354 A | 1/2015 |
| JP | 2017-059889 A | 3/2017 |

OTHER PUBLICATIONS

Marco Baldi et al: "A comparison between APSK and QAM in wireless tactical scenarios for land mobile systems", Eurasip Journal On Wireless Communications and Networking, vol. 2012, No. 1, Jan. 1, 2012 (Jan. 1, 2012), p. 317, XP055250515, ISSN: 1687-1499, DOI:10.1186/1687-1499-2012-317.

\* cited by examiner

WIRELESS COMMUNICATION SYSTEM, WIRELESS COMMUNICATION METHOD, AND RECEPTION APPARATUS

CROSS-REFERENCE TO RELATED APPLICATION

The present application is based on PCT filing PCT/JP2021/030455, filed Aug. 19, 2021, the entire contents of which is incorporated herein by reference.

TECHNICAL FIELD

The present disclosure relates to a wireless communication system, a wireless communication method, and a reception apparatus, and more particularly, to a wireless communication system, a wireless communication method, and a reception apparatus using a single-carrier multi-value modulation scheme.

BACKGROUND ART

Non Patent Literature 1 below discloses a technology related to a wireless communication system using a single-carrier multilevel modulation scheme. In wireless communication using a single-carrier multi-value modulation scheme, it is possible to increase a signal to noise ratio (SNR) by increasing transmission power.

On the other hand, an amplifier for transmission signals generally exhibits a linear input/output characteristic in a region where input power is smaller, and exhibits a non-linear characteristic in a region where the power is larger. For this reason, in wireless communication, the more the transmission power increases, the more distortion is likely to occur in a transmission signal.

Non-Patent Literature 1 discloses a technology for keeping transmission power within a linear region of an amplifier in order to avoid an influence of such distortion. In this case, the distortion is not superimposed on the transmission signal, and it is therefore possible to correctly process the signal in a reception apparatus, and effectively prevent erroneous transmission of data.

As a technology for avoiding the problem of distortion associated with an increase in transmission power, a technology disclosed in Patent Literature 1 below is known. In a case where, for example, an amplitude and phase-shift keying (APSK) technique is used as the modulation scheme, a phase shift occurs in a transmission signal with a change in AM/PM characteristics in a region where the input power is larger. Patent Literature 1 discloses a technology for dealing with such a phase shift.

FIG. 1 is a diagram for illustrating an outline of a technology disclosed in Patent Literature 1. More specifically, FIG. 1 illustrates a constellation corresponding to 32-APSK. In 32-APSK, 32 symbols indicated by ○ or • in the drawing are defined by changing the amplitude and phase of a transmission signal. More specifically, four symbols are defined on a first inner circle 10, twelve symbols are defined on a second inner circle 12, and sixteen symbols are defined on an outermost circle 14.

Patent Literature 1 discloses that one or more pilot signals 16 are arranged on each of the first inner circle 10, the second inner circle 12, and the outermost circle 14. The positions of the pilot signals 16 are shared by a transmission apparatus and a reception apparatus. Thus, the reception apparatus can detect a phase shift that has occurred in each concentric circle on the basis of a shift between the positions of the actually received pilot signals 16 and the positions shared in advance.

Then, for example, in a case where a signal belonging to the first inner circle 10 is received, the phase shift that has occurred in the first inner circle 10 is reflected in the signal. In a case where a signal belonging to another concentric circle is received, the phase shift is corrected in a similar manner. According to such a technique, even in a case where a phase shift occurs in a reception signal in a region where transmission power is large, it is possible to correct the shift properly and prevent erroneous transmission of data.

CITATION LIST

Non Patent Literature

Non Patent Literature 1: High-Speed Satellite Mobile Communications: Technologies and Challenges, MOHAMED IBNKAHLA, QUAZI MEHBUBAR RAHMAN, AHMED IYANDA SULYMAN, HISHAM ABDULHUSSEIN AL-ASADY, JUN YUAN, AND AHMED SAFWAT, p 312-339, PROCEEDINGS OF THE IEEE, VOL. 92, NO. 2, February 2004

PATENT LITERATURE

Patent Literature 1: JP 2017-59889 A

SUMMARY OF INVENTION

Technical Problem

However, the technology of Non Patent Literature 1 solves the problem of distortion by abandoning utilization of a non-linear region of the amplifier. That is, according to this technology, the amplifier cannot sufficiently fulfill its inherent capability, and this situation does not agree with an essential request for using a large amount of power without excessive investment in equipment.

In the technology of Patent Literature 1, the transmission apparatus is required to transmit, to the reception apparatus, at least the same number of pilot signals as the number of concentric circles constituting the constellation. In addition, the environment of a wireless signal communication path is not always constant. Thus, the pilot signals need to be executed frequently, preferably at every data communication flow.

Furthermore, in the technology described in Patent Literature 1, it is necessary to transmit a larger number of pilot signals in a case where, for example, quadrature amplitude modulation (QAM) is used as a modulation scheme. That is, as described in Patent Literature 1, in a case where APSK is used as the modulation scheme, a plurality of symbols arranged on concentric circles can be corrected with one common phase shift. Therefore, only one pilot signal is required for a plurality of symbols arranged on the concentric circles.

On the other hand, in the case of QAM, the symbols in the constellation are arranged in a lattice pattern. For example, 4×4=16 or 8×8=64 symbols are arranged in a lattice pattern in the constellation. In this case, even in a case where one pilot signal can be shared by several symbols, it is necessary to prepare a large number of pilot signals in order to properly correct all the symbols.

Transmitting and receiving a large number of pilot signals at every communication flow inevitably results in a lower data rate. In this respect, the technology described in Patent Literature 1 enables use of a large amount of power corresponding to the capability of the amplifier, but still has room for improvement in terms of the data rate.

The present disclosure has been made in view of the above problem, and a first object thereof is to provide a wireless communication system that prevents erroneous transmission of data and secures a high data rate while utilizing a non-linear region of an amplifier.

A second object of the present disclosure is to provide a wireless communication method that prevents erroneous transmission of data and secures a high data rate while utilizing a non-linear region of an amplifier.

A third object of the present disclosure is to provide a reception apparatus that does not erroneously recognize data and secures a high data rate even in a case where a signal utilizing a non-linear region of an amplifier has been transmitted.

Solution to Problem

In order to achieve the above object, a first aspect provides a wireless communication system including a transmission apparatus and a reception apparatus that perform wireless communication using a single-carrier multi-value modulation scheme,
in which the transmission apparatus:
desirably includes a transmission signal amplifier in which transmission power is variable; and
is desirably configured to execute
processing of providing the reception apparatus with a specification related to an input/output characteristic of the transmission signal amplifier, and
processing of providing the reception apparatus with transmission power used for data transmission, and
the reception apparatus is desirably configured to execute:
signal point estimation processing of estimating a constellation of signal points on the basis of the transmission power and the specification;
processing of detecting a reception point of a reception signal, the reception point being a point in constellation coordinates;
processing of calculating likelihood with respect to the signal points for the reception point; and
processing of identifying a symbol intended by the reception point on the basis of a result of the likelihood calculation.

A second aspect provides a wireless communication method using a transmission apparatus and a reception apparatus that perform wireless communication using a single-carrier multi-value modulation scheme,
in which the transmission apparatus desirably includes a transmission signal amplifier in which transmission power is variable, and
the wireless communication method desirably includes:
a step of providing, by the transmission apparatus, the reception apparatus with a specification related to an input/output characteristic of the transmission signal amplifier;
a step of providing, by the transmission apparatus, the reception apparatus with transmission power used for data transmission;
a step of estimating, by the reception apparatus, a constellation of signal points on the basis of the transmission power and the specification;

a step of detecting, by the reception apparatus, a reception point of a reception signal, the reception point being a point in constellation coordinates;
a step of calculating, by the reception apparatus, likelihood with respect to the signal points for the reception point; and
a step of identifying, by the reception apparatus, a symbol intended by the reception point on the basis of a result of the likelihood calculation.

A third aspect provides a reception apparatus for performing wireless communication using a single-carrier multi-value modulation scheme, the reception apparatus being desirably configured to execute:
processing of acquiring, from a transmission apparatus for the wireless communication, a specification related to an input/output characteristic of a transmission signal amplifier used by the transmission apparatus;
processing of acquiring transmission power used for data transmission by the transmission apparatus;
signal point estimation processing of estimating a constellation of signal points on the basis of the transmission power and the specification;
processing of detecting a reception point of a reception signal, the reception point being a point in constellation coordinates;
processing of calculating likelihood with respect to the signal points for the reception point; and
processing of identifying a symbol intended by the reception point on the basis of a result of the likelihood calculation.

Advantageous Effects of Invention

According to the first to third aspects, the reception apparatus can estimate the constellation of the signal points on the basis of the transmission power provided by the transmission apparatus and the specification of the transmission signal amplifier. Thus, according to these aspects, it is possible to secure a high data rate without causing erroneous transmission of data while utilizing the non-linear region of the amplifier.

DESCRIPTION OF EMBODIMENTS

First Embodiment

[Overall Configuration of First Embodiment]

Figure 2:
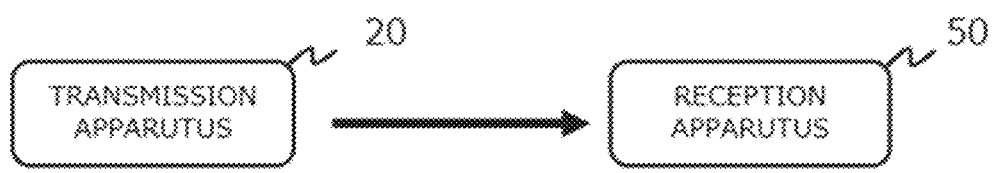
FIG. 2 is a diagram for illustrating a configuration of a wireless communication system of a first embodiment of the present disclosure.

FIG. 2 illustrates an overall configuration of a wireless communication system of a first embodiment of the present disclosure. As illustrated in FIG. 2, the wireless communication system of the present embodiment includes a transmission apparatus 20 and a reception apparatus 50.

[Problem Focused on in First Embodiment]

Figure 3:
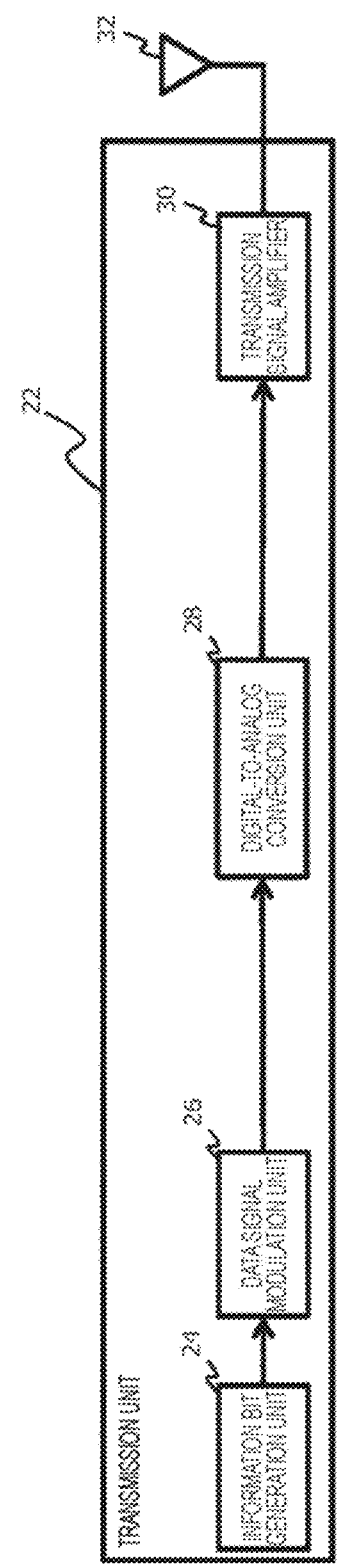
FIG. 3 is a diagram for illustrating a configuration of a transmission apparatus to be compared with a transmission apparatus in the first embodiment of the present disclosure.

FIG. 3 is a block diagram for illustrating a configuration of a transmission apparatus 22 to be compared with the transmission apparatus 20 in the present embodiment. The transmission apparatus 22 as a comparative example includes an information bit generation unit 24. The information bit generation unit 24 generates information bits to be transmitted to the reception apparatus 50. The information bit generation unit 24 may have an error correction coding function or an interleaving function.

The information bits generated by the information bit generation unit 24 are provided to a data signal modulation unit 26. The data signal modulation unit 26 modulates the provided information bits into data signals. Examples of the modulation scheme that can be considered include a modulation scheme that can be used for a single-carrier multivalue modulation scheme, such as quadrature amplitude modulation (QAM) or APSK.

The data signals generated by the data signal modulation unit 26 are provided to a digital-to-analog conversion unit 28. The digital-to-analog conversion unit 28 converts the digitally-modulated data signals into analog transmission signals.

The transmission signals generated by the digital-to-analog conversion unit 28 are provided to a transmission signal amplifier 30. The transmission signal amplifier 30 amplifies and provides the transmission signals to an antenna 32. Then, the transmission signals are transmitted from the antenna 32 to the reception apparatus 50 in the form of wireless signals.

Figure 4:
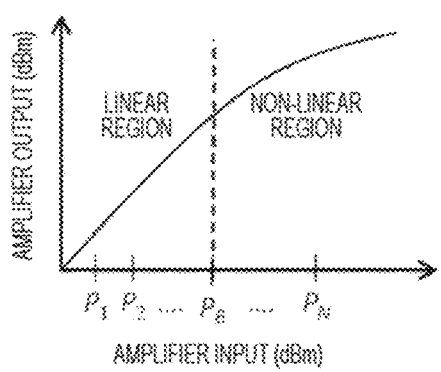
FIG. 4 is a diagram illustrating an input/output characteristic of an amplifier built in the transmission apparatus.

FIG. 4 illustrates an input/output characteristic of the transmission signal amplifier 30. As illustrated in FIG. 4, in a region where input power (horizontal axis) is smaller than $P_B$, output power (vertical axis) of the transmission signal amplifier 30 is proportional to the input power. Then, in a region where the input power exceeds $P_B$, the proportional relationship breaks down. Hereinafter, a region where the output power and the input power are in a proportional relationship is referred to as a "linear region", and a region where the proportional relationship between the output power and the input power breaks down is referred to as a "non-linear region".

Figure 5:
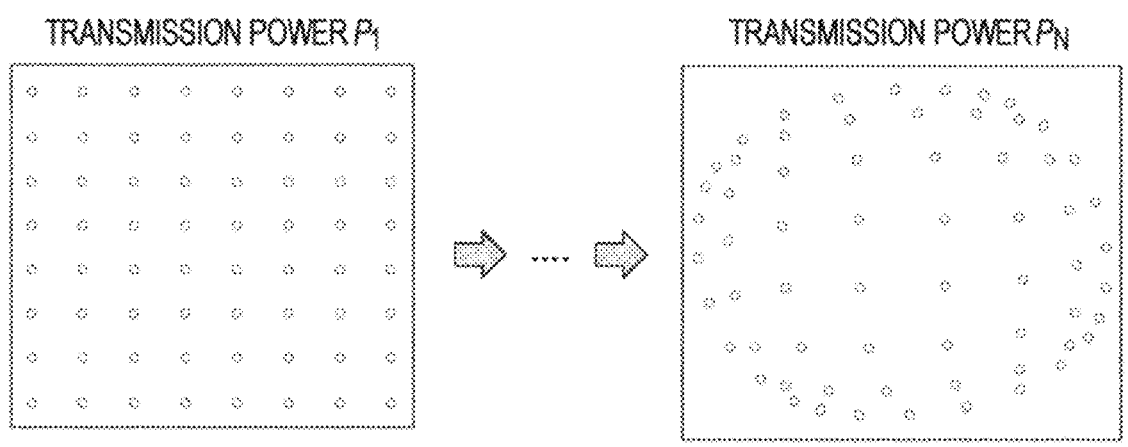
FIG. 5 is a diagram illustrating a state in which distortion occurs in a constellation with an increase in transmission power.

FIG. 5 illustrates a state in which distortion occurs in an 8×8=64-QAM constellation with an increase in transmission power. In a 64-QAM modulation scheme, amplitudes of two carrier waves that are independent of each other are changed and adjusted, and thus 64 symbols arranged in a lattice pattern are defined. Hereinafter, points in constellation coordinates at which the 64 symbols are individually defined are referred to as "signal points". Furthermore, points in the constellation coordinates of actually transmitted data signals are referred to as "reception points".

In the linear region of the transmission signal amplifier 30, as illustrated on the left side of FIG. 5 (transmission power $P_1$), the reception points form a constellation without distortion. On the other hand, in the non-linear region of the transmission signal amplifier 30, as illustrated on the right side of FIG. 5 (transmission power $P_N$), distortion is superimposed on the constellation of the reception points.

The reception apparatus 50 performs likelihood calculation with respect to an adjacent signal point for each reception point included in a transmission signal, and recognizes each reception point as one of the 64 symbols on the basis of the calculation results. The calculation of likelihood can be executed by, for example, a technique described in the following document.

On the Optimality of Bit Detection of Certain Digital Modulations, Marvin K. Simon and Ramesh Annavajjala, p 299-307, IEEE TRANSACTIONS ON COMMUNICATIONS, VOL. 53, NO. 2, Feb. 2005

In a case where the reception apparatus 50 performs the likelihood calculation using signal points constituting a constellation without distortion, reception points generated in the linear region can be correctly recognized. However, reception points generated in the non-linear region have been shifted from the original positions in the constellation, and therefore cannot be correctly recognized. Thus, in a case where the transmission signal amplifier 30 uses the non-linear region, erroneous recognition of data may occur in the reception apparatus 50.

Features of First Embodiment

Erroneous recognition of data can be prevented also by the transmission apparatus 22 as the comparative example in a case where the transmission power is limited to the linear region of the transmission signal amplifier 30. However, in that case, the amplification capability of the transmission signal amplifier 30 cannot be sufficiently utilized.

Figure 6:
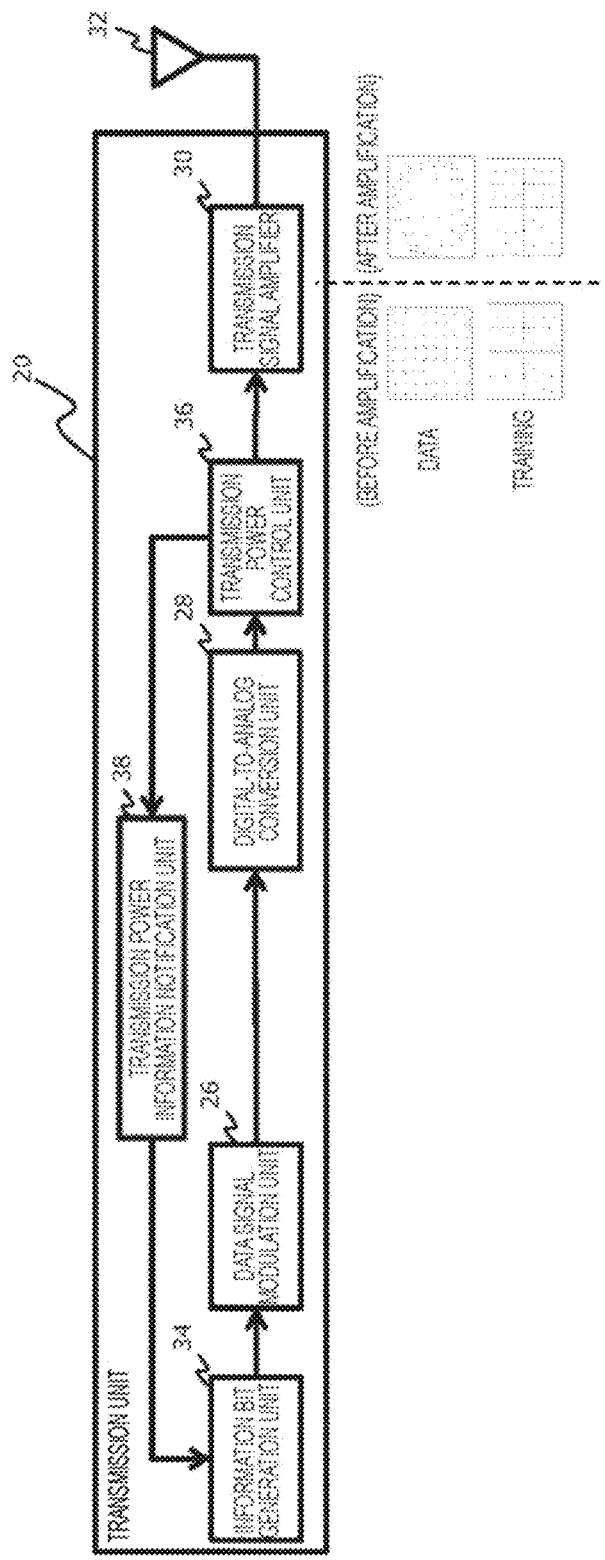
FIG. 6 is a block diagram for illustrating a configuration of the transmission apparatus in the first embodiment of the present disclosure.

FIG. 6 is a block diagram for illustrating a configuration of the transmission apparatus 20 in the present embodiment. In FIG. 6, the same elements as those included in the transmission apparatus 22 as the comparative example (see FIG. 3) are denoted by the same reference numerals, and the description thereof will be omitted or simplified.

In the transmission apparatus 20 in the present embodiment, the information bit generation unit 24 in the transmission apparatus 22 as the comparative example is replaced with an information bit generation unit 34. The information bit generation unit 34 included in the transmission apparatus 20 in the present embodiment generates information bits related to specifications of the transmission apparatus 20 at a stage when communication between the transmission apparatus 20 and the reception apparatus 50 is started. Specifically, the modulation scheme used by the transmission apparatus 20 and the input/output characteristic (see FIG. 4) of the transmission signal amplifier 30 are converted into information bits.

The information bits generated in this manner are transmitted from the transmission apparatus 20 to the reception apparatus 50 at the stage when communication between the transmission apparatus 20 and the reception apparatus 50 is started. Thus, in the present embodiment, the modulation scheme used by the transmission apparatus 20 and the input/output characteristic of the transmission signal amplifier 30 are shared between the transmission apparatus 20 and the reception apparatus 50 at the start of communication between the transmission apparatus 20 and the reception apparatus 50.

The transmission apparatus 20 in the present embodiment includes a transmission power control unit 36 in the preceding stage of the transmission signal amplifier 30. The transmission power control unit 36 controls the transmission power so that desired communication quality is obtained. The transmission power control unit 36 provides a transmission power command to the transmission signal amplifier 30 and also to a transmission power information notification unit 38.

The transmission power information notification unit 38 provides a transmission power command value to the information bit generation unit 34. Then, the information bit generation unit 34 generates bit information related to the current transmission power, and includes the information in transmission data. Thus, the transmission apparatus 20 of the present embodiment transmits, with transmission power set by the transmission power control unit 36, a transmission signal including information regarding the transmission power to the reception apparatus 50.

Meanwhile, when transmitting data after the start of communication, the transmission apparatus 20 of the present embodiment transmits a training signal together with the data. FIG. 6 illustrates constellations of the data and the training signal before and after amplification below the transmission signal amplifier 30. In a case where the transmission signal amplifier 30 uses the non-linear region, the constellation of the data after amplification is accompanied by distortion as illustrated in this drawing.

The information of the training signal is shared between the transmission apparatus 20 and the reception apparatus 50 in advance, and is preferably transmitted with power (amplitude) that is kept within the linear region of the transmission signal amplifier 30. In the course of arriving the reception apparatus 50, the training signal may be shifted in phase and amplitude due to the environment of a wireless signal communication path. The reception apparatus 50 detects an influence of the shift caused by the communication path on the basis of the shift between the reception points of the training signal that has been actually received and known signal points of the training signal. Then, the reception apparatus 50 eliminates the influence caused by the communication path by reflecting the detection result in each of the reception points of the data.

Figure 7:
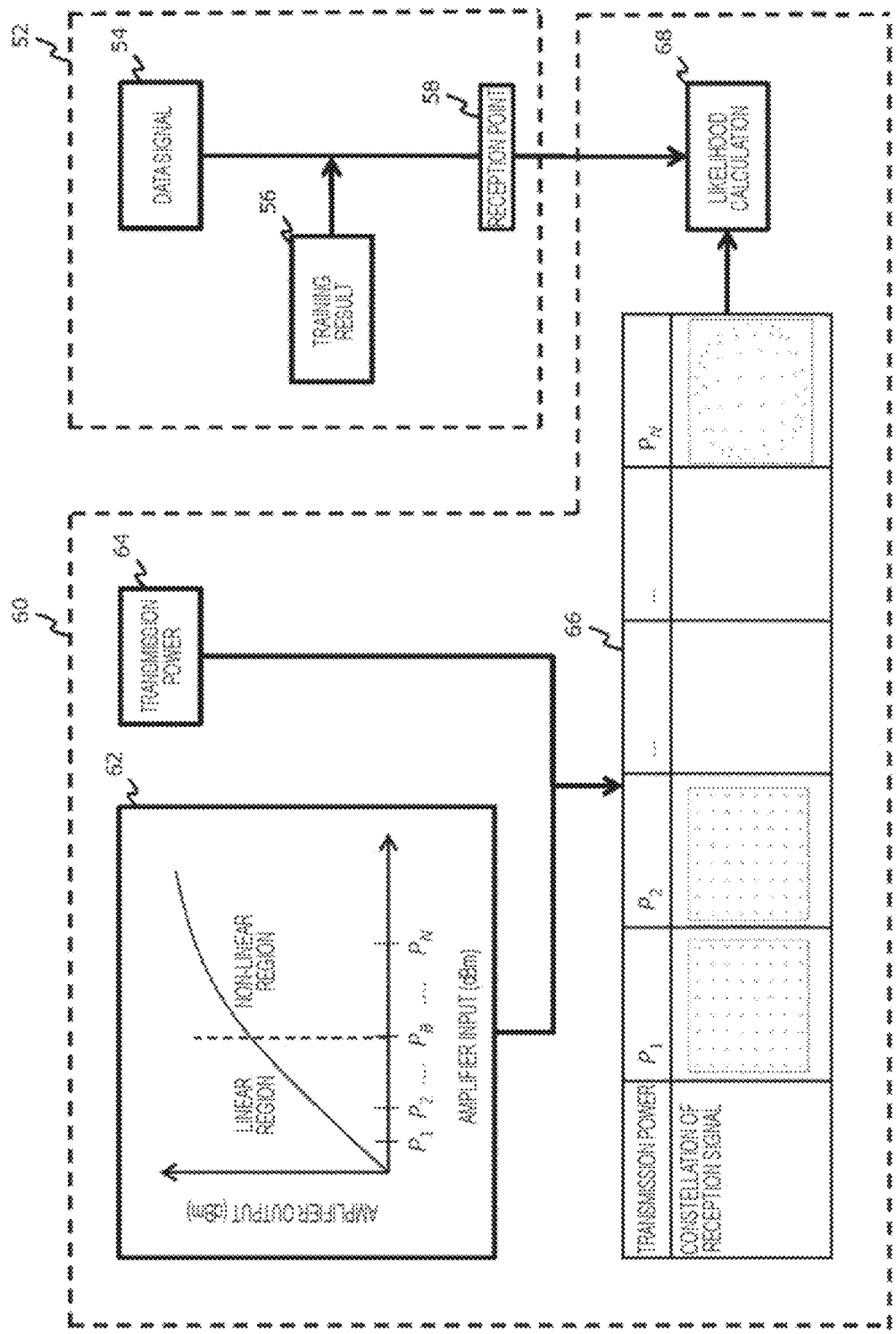
FIG. 7 is a block diagram for illustrating a configuration of a main part of a reception apparatus in the first embodiment of the present disclosure.

FIG. 7 is a block diagram for illustrating a configuration of a main part of the reception apparatus 50 in the present embodiment. As illustrated in FIG. 7, the reception apparatus 50 of the present embodiment includes a data signal equalization unit 52. The data signal equalization unit 52 is a block for back calculating an amplitude of a communication path response and phase shift information to obtain an estimated value of a transmission signal. Specifically, the data signal equalization unit 52 executes processing of reflecting a training result 56 in a data signal 54. As a result, reception points 58 in which the shift caused by the environment of the communication path is offset are obtained.

The reception apparatus 50 of the present embodiment further includes a likelihood computation unit 60. The likelihood computation unit 60 is a block for computing the likelihood in accordance with information regarding the current constellation. The likelihood computation unit 60 first identifies a constellation 66 of a reception signal on the basis of specification information 62 of the transmission apparatus 20 acquired at the start of communication and current transmission power 64 received together with a data signal.

The modulation scheme used by the transmission apparatus 20 and the input/output characteristic of the transmission signal amplifier 30 are known information for the reception apparatus 50. Then, in a case where these pieces of information are known and the actually used transmission power is known, the constellation of the reception signal can be reproduced. Here, as illustrated in a lower part of FIG. 7, the constellation 66 corresponding to transmission power $P_i$ (i=1 to N) is selected. Upon completion of this processing, the likelihood computation unit 60 then uses the selected constellation 66 to perform likelihood calculation 68 for each of the reception points 58 in which the training result has been reflected.

Figure 8:
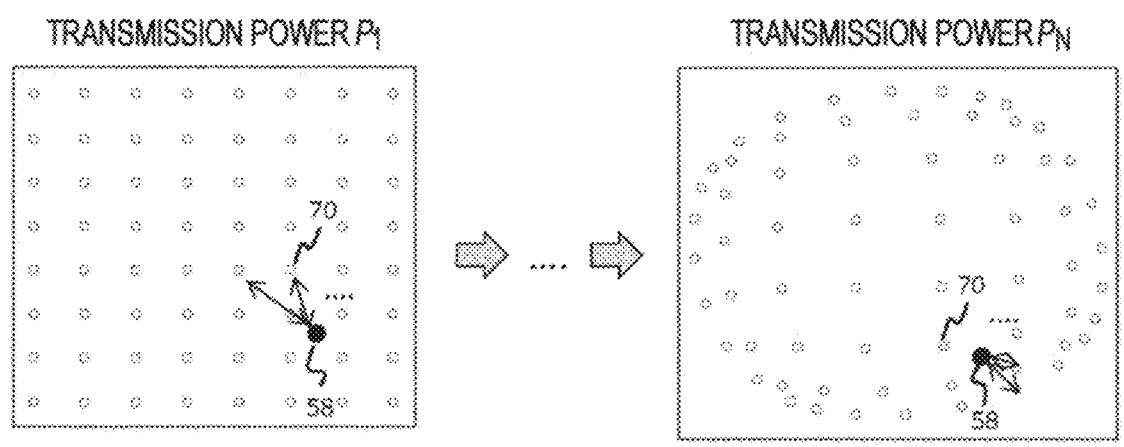
FIG. 8 is a diagram for illustrating a characteristic operation of the reception apparatus in the first embodiment of the present disclosure.

FIG. 8 is a diagram for illustrating an outline of the likelihood calculation 68. The left side of FIG. 8 illustrates an outline of the likelihood calculation 68 in a case where the transmission power is $P_1$. In this case, the constellation 66 of the reception signal has no distortion in which signal points 70 are correctly arranged in a lattice pattern. With reference to the constellation 66, the likelihood computation unit 60 calculates the likelihood of some of the signal points 70 located near the reception point 58 by using a normal distribution with respect to Euclidean distances between the reception point 58 and the signal points 70. Then, the signal point 70 with the largest likelihood is adopted as a symbol corresponding to the reception point 58.

The right side of FIG. 8 illustrates an outline of the likelihood calculation 68 in a case where the transmission power is $P_N$. In this case, the constellation 66 of the reception signal includes a shift caused by non-linearity of the transmission signal amplifier 30 at each of the signal points 70. With reference to the constellation 66 that includes the shift, the likelihood computation unit 60 calculates the likelihood for the reception point 58 by a technique similar to that described above. Then, on the basis of the result, a symbol indicated by the reception point 58 is identified.

As described above, the wireless communication system of the present embodiment can cause the transmission apparatus 20 to transmit a high-power transmission signal by using the non-linear region of the transmission signal amplifier 30. In addition, by passing the specification of the transmission signal amplifier 30 to the reception apparatus 50 at the start of communication, it is possible to reproduce a distorted constellation corresponding to the non-linear region in the reception apparatus 50 without requiring subsequent information provision. Then, by executing the likelihood calculation using the constellation, it is possible to prevent erroneous recognition of data also for transmission signals using the non-linear region. Furthermore, it is possible to eliminate, at every data transmission, influences of phase and amplitude shifts caused by the communication path at every reception point with a training signal having an extremely small data amount. Thus, according to the wireless communication system of the present embodiment, it is possible to prevent erroneous transmission of data and secure a high data rate while utilizing the non-linear region of the transmission signal amplifier 30.

Modification of First Embodiment

Meanwhile, FIG. 7 illustrates a state in which the likelihood computation unit 60 reproduces constellations of reception signals for a plurality of transmission powers $P_1$ and $P_2$ belonging to the linear region of the transmission signal amplifier 30. However, the technique for reproducing constellations of reception signals is not limited thereto. That is, the likelihood computation unit 60 may use in common the same distortion-free constellation for transmission power belonging to the linear region of the transmission signal amplifier 30, and may reproduce constellations of reception signals only for transmission power belonging to the non-linear region.

In the above-described first embodiment, the transmission apparatus 20 provides the specification of the transmission signal amplifier 30 to the reception apparatus 50 at the start of wireless communication. However, the present disclosure is not limited thereto. For example, the transmission apparatus 20 may store the reception apparatus 50 to which the specification has been provided, and the reception apparatus 50 to which the specification has been provided may store the information. Then, transmission and reception of the above specification may be omitted in the second and subsequent communications between the transmission apparatus 20 and the reception apparatus 50.

In addition, in the above-described first embodiment, the transmission apparatus 20 provides the reception apparatus 50 with the specification of the transmission signal amplifier 30 and information regarding the modulation scheme used for the wireless communication. However, the present disclosure is not limited thereto. For example, in a case where the modulation scheme used for communication between the transmission apparatus 20 and the reception apparatus 50 has been determined in advance, provision of information regarding the modulation scheme can be omitted.

Second Embodiment

Next, a wireless communication system of a second embodiment of the present disclosure will be described with reference to FIGS. 9 to 11 together with FIG. 2 described above.

Figure 1:
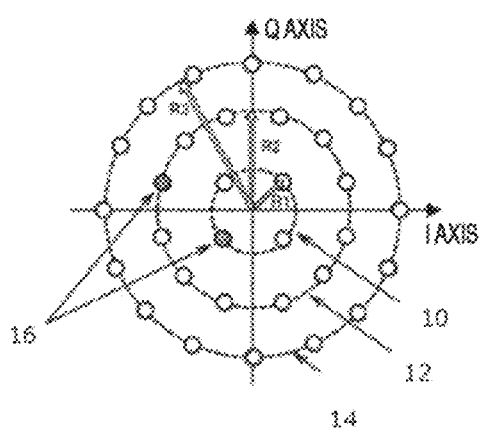
FIG. 1 is a diagram for illustrating an outline of a technology disclosed in Patent Literature 1.
Figure 9:
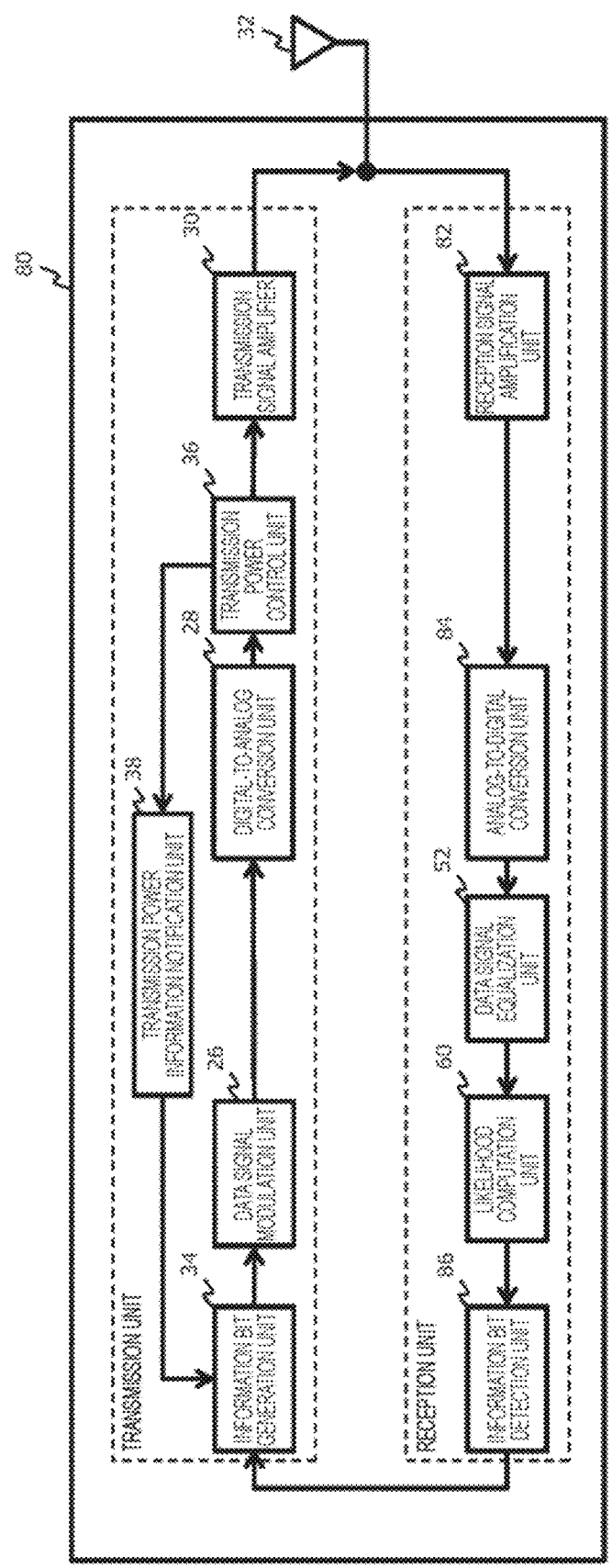
FIG. 9 is a diagram for illustrating a configuration of a communication device included in a wireless communication system of a second embodiment of the present disclosure.

FIG. 9 is a block diagram for illustrating a configuration of a communication device 80 used in the wireless communication system of the present embodiment. The communication device 80 illustrated in FIG. 9 includes a transmission unit for transmitting a wireless signal and a reception unit for processing a received wireless signal. The communication device 80 can be used as either the transmission apparatus 20 or the reception apparatus 50 illustrated in FIG. 1. The following description shows a case where both the transmission apparatus 20 and the reception apparatus 50 are configured by the communication device 80 illustrated in FIG. 9.

The communication device 80 in the present embodiment includes a transmission unit having a configuration similar to that of the transmission apparatus 20 in the first embodiment. Similarly to the reception apparatus 50 of the first embodiment, the communication device 80 includes a data signal equalization unit 52 and a likelihood computation unit 60. In FIG. 9, the same elements as those described in the first embodiment are denoted by the reference numerals illustrated in FIG. 6 or 7, and redundant description will be omitted or simplified.

The communication device 80 in the present embodiment provides a signal received by an antenna 32 to a reception signal amplification unit 82. The reception signal amplification unit 82 amplifies the reception signal with an appropriate gain and provides the amplified reception signal to an analog-to-digital conversion unit 84.

The analog-to-digital conversion unit 84 is a block for demodulating an analog reception signal into a digital signal. The signal digitized by the analog-to-digital conversion unit 84 is provided to the data signal equalization unit 52.

In the data signal equalization unit 52 and the likelihood computation unit 60, processing similar to that in the case of the first embodiment is performed. As a result, data is accurately recognized regardless of whether distortion is included in the constellation of the reception signal.

A signal symbolized in the likelihood computation unit 60 is provided to an information bit detection unit 86. In the present embodiment, the information bit detection unit 86 converts, into bits, information related to a bit error rate (BER) of a signal, in addition to data to be transmitted to and received from a communication partner. Then, the BER information is provided to an information bit generation unit 34 of the transmission unit.

For the purpose of providing the BER information to the communication partner, the information bit generation unit 34 performs bit generation processing so as to include the information in a transmission signal. As a result, in the present embodiment, the communication device 80 provides a communication device 80 acting as the communication partner with information regarding the BER realized by the current transmission power.

Similarly, the communication device 80 illustrated in FIG. 9 is also provided with information regarding the BER realized by the current transmission power from the communication partner. This information is restored to a data signal by the reception unit of the communication device 80, and then fed back to a transmission power control unit 36 of the transmission unit. On the basis of the information fed back in this way, the transmission power control unit 36 controls the transmission power so that the communication quality is improved.

Figure 10:
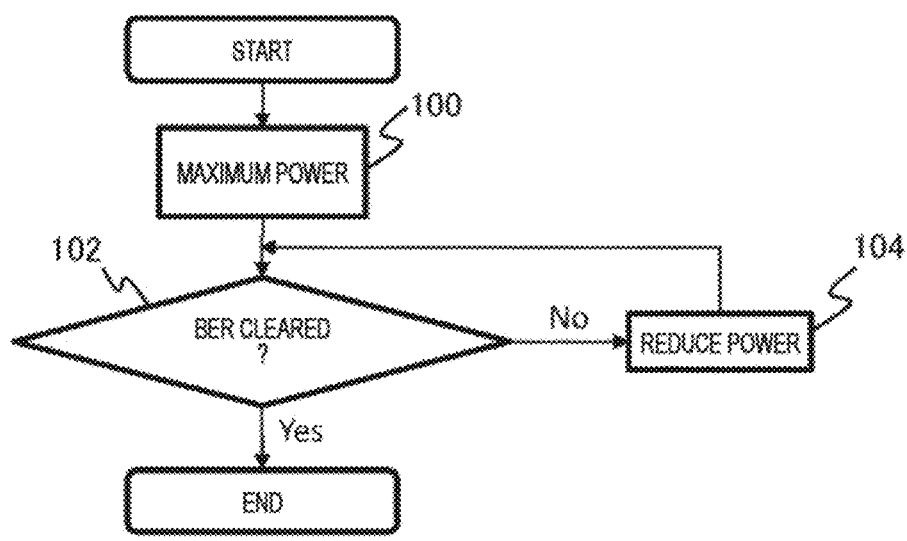
FIG. 10 is a flowchart for illustrating a flow of processing executed by the communication device illustrated in FIG. 9 to control transmission power.

FIG. 10 is a flowchart for illustrating an example of processing executed by the transmission power control unit 36 in the present embodiment. FIG. 10 illustrates a routine that is started immediately after the communication device 80 has established communication with the other communication device 80.

In this routine, first, the transmission power is set to a maximum power $P_N$ (step 100). Next, it is determined whether the BER returned from the communication partner with respect to the set transmission power is equal to or less than a threshold (e.g., 1E-6) (step 102).

The maximum power $P_N$ is the most advantageous power for obtaining an excellent SNR in a case where distortion of the constellation associated with non-linearity of a transmission signal amplifier 30 has been appropriately absorbed. If it is determined in step 102 that the BER is equal to or less than the threshold, it can be determined that a transmission signal has been sufficiently accurately received. Therefore, in this case, it can be determined that the distortion of the constellation has been appropriately absorbed in the communication device 80 acting as the communication partner. That is, it can be determined that the current transmission power is the maximum power for achieving desired communication quality.

Such transmission power is suitable for securing a high data rate and a high SNR. Thus, if the determination in step 102 is affirmative, it is determined that the current transmission power is appropriate, and the power control routine ends.

On the other hand, if it is determined in step 102 that the BER exceeds the threshold, it can be determined that the communication device 80 acting as the communication partner has not accurately acquired the data. That is, it can be determined that there is a possibility that the distortion of the constellation is too large for the communication device 80 acting as the communication partner. In this case, the transmission power control unit 36 attempts a reduction in transmission power in order to alleviate the distortion of the constellation (step 104). For example, in a case where the current transmission power is $P_N$, the power is changed to $P_{N-1}$.

Thereafter, the processing of step 102 is executed again. Then, when the transmission power with which the BER is cleared is found as a result of repeating steps 102 and 104, this routine ends at that point.

According to the above processing, as the transmission power to be used by the communication device 80, the largest amount of power with which the BER is cleared is determined after the start of communication. Thus, according to the wireless communication system of the present embodiment, it is possible to obtain effects of achieving optimization of the transmission power and achieving the best communication quality, in addition to effects similar to those in the case of the first embodiment.

Modification of Second Embodiment

Figure 11:
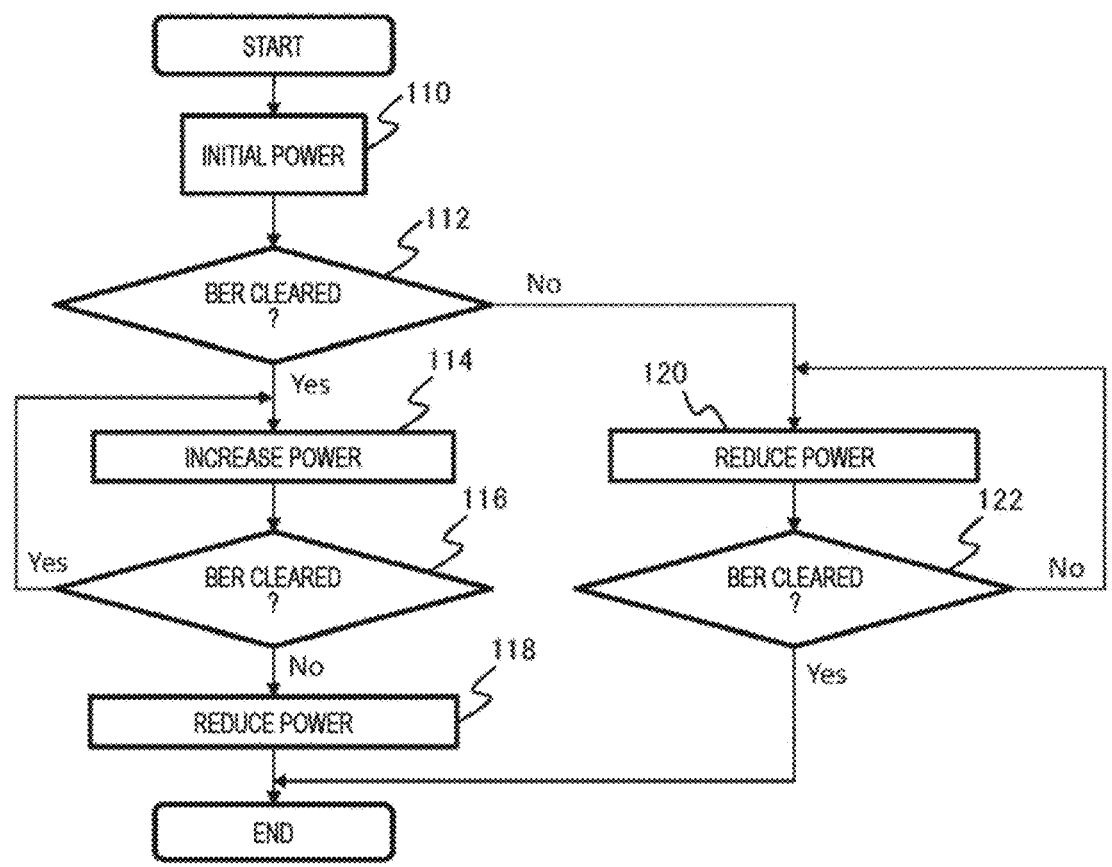
FIG. 11 is a flowchart for illustrating a modification of the processing executed by the communication device illustrated in FIG. 9 to control transmission power.

FIG. 11 is a flowchart for illustrating an example of another routine that can be executed, instead of the routine illustrated in FIG. 10, by the transmission power control unit 36 to control the transmission power. Similarly to the routine illustrated in FIG. 10, the routine illustrated in FIG. 11 is also started immediately after the communication device 80 has established communication with the other communication device 80.

In the routine illustrated in FIG. 11, first, the transmission power is set to a preset initial power (step 110). The initial power is a power expected to be the maximum power with which the BER is cleared.

Next, it is determined whether the BER provided from the communication device 80 acting as the communication partner clears a condition that the BER is equal to or less than the threshold (step 112). This processing is substantially the same as the processing of step 102 illustrated in FIG. 10.

In step 112, if it is determined that the BER clears the condition, it can be determined that there is room for increasing the transmission power. Therefore, in this case, the transmission power control unit 36 attempts an increase in transmission power (step 114). Specifically, the transmission power is changed from the current power $P_i$ to $P_{i+1}$ which is one stage larger.

Next, it is determined again whether the BER provided from the communication device 80 acting as the communication partner for the increased transmission power clears the threshold condition (step 116). If the result shows that the BER is cleared, the processing of step 114 is executed again.

In this routine, if the determination in step 116 is negative, it can be determined that the transmission power has exceeded, by one stage at that time, the upper limit of the power with which the BER is cleared. In this case, it can be determined that the power one stage smaller than the current transmission power is the maximum power with which the BER is cleared. Thus, if the determination in step 116 is negative, the transmission power is lowered by one stage (step 118), and this routine ends.

In step 112 described above, if it is determined that the BER cannot be cleared with the initial power set as the transmission power, processing of lowering the transmission power is executed (step 120). Then, it is determined whether the BER for the changed transmission power clears the threshold condition (step 122).

If the result shows that the BER is not cleared, it can be determined that the transmission power is still excessive. Thus, if the determination in step 122 is negative, the processing in step 120 is executed again.

In this routine, if the determination in step 122 is affirmative, it can be determined at that time that the transmission power has been reduced to the maximum power with which the BER can be cleared. Then, in this case, the current transmission power is the optimal power, and this routine ends promptly thereafter.

As described above, according to the routine illustrated in FIG. 11, as in the case of the routine illustrated in FIG. 10, the transmission power can be set to the maximum power that satisfies a desired BER. Furthermore, according to the routine illustrated in FIG. 11, in a case where the optimum transmission power is sufficiently smaller than the maximum power $P_N$, the optimum transmission power can be found more promptly than the routine illustrated in FIG. 10.

REFERENCE SIGNS LIST

20 Transmission apparatus
30 Transmission signal amplifier
34 Information bit generation unit
36 Transmission power control unit
38 Transmission power information notification unit
50 Reception apparatus
52 Data signal equalization unit
60 Likelihood computation unit
80 Communication device
86 Information bit detection unit

The invention claimed is:

1. A wireless communication system including a transmitter and a receiver that perform wireless communication using a single-carrier multi-value modulation scheme,
   wherein the transmitter comprises
   a transmission signal amplifier in which transmission power is variable and
   the transmitter is configured to execute;
   providing the receiver with a specification related to an input/output characteristic of the transmission signal amplifier; and
   of providing the receiver with transmission power used for data transmission, and wherein
   the receiver is configured to execute:
   estimating a constellation of signal points on the basis of the transmission power and the specification;
   detecting a reception point of a reception signal, the reception point being a point in constellation coordinates;
   calculating likelihood for the reception point, with respect to the signal points; and
   identifying a symbol intended by the reception point on the basis of a result of the likelihood calculation.

2. The wireless communication system according to claim 1, wherein
   the processing for estimating the constellation includes:
   setting, as the constellation of the signal points, a reference constellation of the single-carrier multi-value modulation scheme in a case where the transmission power belongs to a linear region of the transmission signal amplifier; and
   setting, as the constellation of the signal points, a constellation obtained by adding distortion corresponding to the transmission power and the specification to the reference constellation in a case where the transmission power belongs to a non-linear region of the transmission signal amplifier.

3. The wireless communication system according to claim 1, wherein
the transmitter
is configured to further execute transmitting a training signal, and wherein
the receiver
stores an original value of the training signal; and
the receiver is configured to further execute;
detecting an influence of a communication path on the reception signal on the basis of a difference between the original value and a value of the training signal that has been actually received; and
eliminating the influence of the communication path from the reception point prior to the likelihood calculation.

4. The wireless communication system according to claim 3, wherein the training signal is transmitted with power belonging to the linear region of the transmission signal amplifier.

5. The wireless communication system according to claim 1, wherein
the receiver
is configured to further execute;
calculating an error rate of the reception signal; and
providing the error rate to the transmitter, and wherein
the transmitter
is configured to further execute
controlling the transmission power to be a maximum power with which a requirement related to the error rate is cleared.

6. The wireless communication system according to claim 5, wherein
the processing of controlling the transmission power to be a maximum power includes:
setting the transmission power to the maximum power at a start of wireless communication;
acquiring the error rate from the receiver;
determining whether the error rate clears the requirement; and
gradually decreasing the transmission power until a result that the error rate clears the requirement is obtained.

7. A wireless communication method using a transmitter and a receiver that perform wireless communication using a single-carrier multi-value modulation scheme,
wherein the transmitter includes a transmission signal amplifier in which transmission power is variable, and
the wireless communication method includes:
providing, by the transmitter, the receiver with a specification related to an input/output characteristic of the transmission signal amplifier;
providing, by the transmitter, the receiver with transmission power used for data transmission;
estimating, by the receiver, a constellation of signal points on the basis of the transmission power and the specification;
detecting, by the receiver, a reception point of a reception signal, the reception point being a point in constellation coordinates;
calculating, by the receiver, likelihood for the reception point, with respect to the signal points; and
identifying, by the receiver, a symbol intended by the reception point on the basis of a result of the likelihood calculation.

8. A receiver for performing wireless communication using a single-carrier multi-value modulation scheme, the receiver being configured to execute:
acquiring, from a transmitter for the wireless communication, a specification related to an input/output characteristic of a transmission signal amplifier used by the transmitter;
acquiring transmission power used for data transmission by the transmitter;
estimating a constellation of signal points on the basis of the transmission power and the specification;
detecting a reception point of a reception signal, the reception point being a point in constellation coordinates;
calculating likelihood for the reception point, with respect to the signal points; and
identifying a symbol intended by the reception point on the basis of a result of the likelihood calculation.

9. The wireless communication system according to claim 2, wherein
the transmitter is configured to further execute transmitting a training signal, and wherein
the receiver stores an original value of the training signal; and
the receiver is configured to further execute:
detecting an influence of a communication path on the reception signal on the basis of a difference between the original value and a value of the training signal that has been actually received; and
eliminating the influence of the communication path from the reception point prior to the likelihood calculation.

10. The wireless communication system according to claim 9, wherein the training signal is transmitted with power belonging to the linear region of the transmission signal amplifier.

11. The wireless communication system according to claim 2, wherein
the receiver is configured to further execute:
calculating an error rate of the reception signal; and
providing the error rate to the transmitter, and wherein
the transmitter is configured to further execute controlling the transmission power to be a maximum power with which a requirement related to the error rate is cleared.

12. The wireless communication system according to claim 3, wherein
the receiver is configured to further execute:
calculating an error rate of the reception signal; and
providing the error rate to the transmitter, and wherein
the transmitter is configured to further execute controlling the transmission power to be a maximum power with which a requirement related to the error rate is cleared.

13. The wireless communication system according to claim 4, wherein
the receiver is configured to further execute:
calculating an error rate of the reception signal; and
providing the error rate to the transmitter, and wherein
the transmitter is configured to further execute controlling the transmission power to be a maximum power with which a requirement related to the error rate is cleared.

14. The wireless communication system according to claim 9, wherein
the receiver is configured to further execute:
calculating an error rate of the reception signal; and
providing the error rate to the transmitter, and wherein
the transmitter is configured to further execute controlling the transmission power to be a maximum power with which a requirement related to the error rate is cleared.

15. The wireless communication system according to claim 10, wherein
   the receiver is configured to further execute:
   calculating an error rate of the reception signal; and
   providing the error rate to the transmitter, and wherein
   the transmitter is configured to further execute controlling the transmission power to be a maximum power with which a requirement related to the error rate is cleared.

16. The wireless communication system according to claim 11, wherein
   the processing of controlling the transmission power to be a maximum power includes:
   setting the transmission power to the maximum power at a start of wireless communication;
   acquiring the error rate from the receiver;
   determining whether the error rate clears the requirement; and
   gradually decreasing the transmission power until a result that the error rate clears the requirement is obtained.

17. The wireless communication system according to claim 12, wherein
   the processing of controlling the transmission power to be a maximum power includes:
   setting the transmission power to the maximum power at a start of wireless communication;
   acquiring the error rate from the receiver;
   determining whether the error rate clears the requirement; and
   gradually decreasing the transmission power until a result that the error rate clears the requirement is obtained.

18. The wireless communication system according to claim 13, wherein
   the processing of controlling the transmission power to be a maximum power includes:
   setting the transmission power to the maximum power at a start of wireless communication;
   acquiring the error rate from the receiver;
   determining whether the error rate clears the requirement; and
   gradually decreasing the transmission power until a result that the error rate clears the requirement is obtained.

19. The wireless communication system according to claim 14, wherein
   the processing of controlling the transmission power to be a maximum power includes:
   setting the transmission power to the maximum power at a start of wireless communication;
   acquiring the error rate from the receiver;
   determining whether the error rate clears the requirement; and
   gradually decreasing the transmission power until a result that the error rate clears the requirement is obtained.

20. The wireless communication system according to claim 15, wherein
   the processing of controlling the transmission power to be a maximum power includes:
   setting the transmission power to the maximum power at a start of wireless communication;
   acquiring the error rate from the receiver;
   determining whether the error rate clears the requirement; and
   gradually decreasing the transmission power until a result that the error rate clears the requirement is obtained.

* * * * *